US012602285B2

(12) United States Patent
Li et al.

(10) Patent No.: US 12,602,285 B2
(45) Date of Patent: Apr. 14, 2026

(54) SYSTEM FOR HANDLING REPEATED PROGRAMMING ERRORS

(71) Applicant: Micron Technology, Inc., Boise, ID (US)

(72) Inventors: Juane Li, San Jose, CA (US); Chenjie Zhou, Shanghai (CN); Wenchi Hong, Zhubei (TW); Daniel Danching Zhang, Milpitas, CA (US); Naveen Bolisetty, Telangana (IN)

(73) Assignee: Micron Technology, Inc., Boise, ID (US)

( * ) Notice: Subject to any disclaimer, the term of this patent is extended or adjusted under 35 U.S.C. 154(b) by 63 days.

(21) Appl. No.: 18/791,155

(22) Filed: Jul. 31, 2024

(65) Prior Publication Data

US 2026/0037375 A1 Feb. 5, 2026

(51) Int. Cl.
*G06F 11/10* (2006.01)
*G06F 11/07* (2006.01)

(52) U.S. Cl.
CPC ........ *G06F 11/1068* (2013.01); *G06F 11/076* (2013.01); *G06F 11/0772* (2013.01)

(58) Field of Classification Search
CPC . G06F 11/1068; G06F 11/076; G06F 11/0772
USPC ....... 714/794, 769, 773; 365/185.091, 85.11, 365/185.29, 230.03, 185.33, 200
See application file for complete search history.

(56) References Cited

U.S. PATENT DOCUMENTS

| | | | | |
|---|---|---|---|---|
| 5,530,673 A * | 6/1996 | Tobita | ................. | G06F 12/0866 |
| | | | | 365/185.11 |
| 6,078,520 A * | 6/2000 | Tobita | .................. | G11C 29/765 |
| | | | | 365/185.11 |
| 11,404,131 B2 * | 8/2022 | Xie | ......................... | G11C 16/26 |
| 11,740,959 B2 * | 8/2023 | Xu | .......................... | G11C 16/10 |
| | | | | 714/6.1 |
| 2013/0246891 A1 | 9/2013 | Manning et al. | | |
| 2014/0310573 A1* | 10/2014 | Mao | ...................... | G06F 3/0653 |
| | | | | 714/773 |

(Continued)

OTHER PUBLICATIONS

International Search Report and Written Opinion for International Application No. PCT/US2025/039760, mailed Nov. 26, 2025, 10 Pages.

*Primary Examiner* — John J Tabone, Jr.
(74) *Attorney, Agent, or Firm* — Lowenstein Sandler LLP

(57) ABSTRACT

A system comprising a plurality of memory devices, as well as a processing device, operatively coupled with the plurality of memory devices. The processing device detects a write operation error during a write operation on a memory segment of the plurality of memory devices, wherein the memory segment comprises respective memory cells from each of the plurality of memory devices. The processing device determines that a back-to-back (B2B) count satisfies a B2B threshold criterion, wherein the B2B count corresponds to one of the plurality of memory devices. Responsive to determining that the B2B count satisfies the B2B threshold criterion, the processing device prevents, for a threshold duration of time, any subsequent write operations from being performed on the one of the plurality of memory devices, wherein a length of the threshold duration of time is determined by a period during which the B2B count continuously satisfies the B2B threshold criterion.

20 Claims, 4 Drawing Sheets

(56) References Cited

U.S. PATENT DOCUMENTS

| | | | |
|---|---|---|---|
| 2016/0110124 A1 | 4/2016 | Camp et al. | |
| 2018/0150255 A1* | 5/2018 | Woo | G06F 3/0635 |
| 2020/0026597 A1 | 1/2020 | Chu et al. | |
| 2021/0020229 A1* | 1/2021 | Xie | G11C 11/1675 |
| 2022/0291845 A1* | 9/2022 | Kasai | G06F 3/0679 |
| 2023/0115457 A1* | 4/2023 | Koo | G11C 29/702 |
| | | | 711/154 |
| 2023/0195354 A1 | 6/2023 | Liu et al. | |
| 2024/0054046 A1* | 2/2024 | Khayat | G11C 29/52 |
| 2024/0161838 A1* | 5/2024 | Ciocchini | G11C 11/5642 |
| 2024/0176705 A1 | 5/2024 | Gupta et al. | |

* cited by examiner

SYSTEM FOR HANDLING REPEATED PROGRAMMING ERRORS

TECHNICAL FIELD

Embodiments of the disclosure relate generally to memory sub-systems, and more specifically, relate to a system for handling repeated programming errors.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
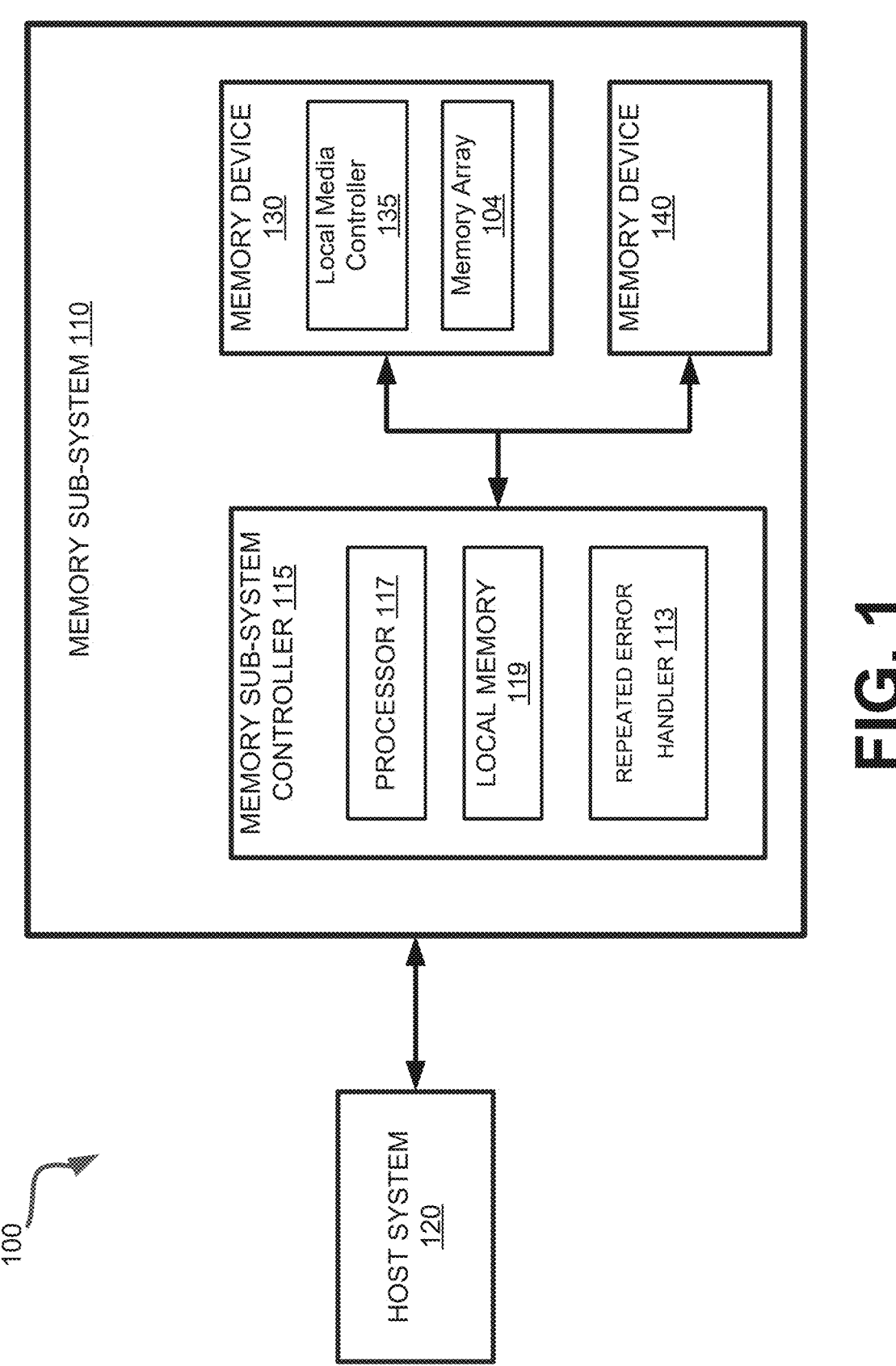
FIG. 1 illustrates an example computing system that includes a memory sub-system in accordance with some embodiments of the present disclosure.

Aspects of the present disclosure are directed to a system for handling repeated programming errors. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or a three-dimensional grid. The memory cells can be formed onto a silicon wafer in an array of columns and rows. A bitline can refer to one or more conductive lines coupled to a column of associated memory cells in a memory device. A wordline can refer to one or more conductive lines coupled to a row of associated memory cells in a memory device that are used with one or more bitlines to generate the address of each of the memory cells. The intersection of a bitline and a wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits.

Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device. For example, in a system implementing a NAND architecture, data can be concurrently written to multiple blocks, each from a respective die (e.g., writing to a memory segment (such as a block stripe)). Such operations require successful write operations across in each of the dies in the block stripe.

As memory cells go through repeated program and erase (P/E) cycles, they begin to degrade over time. This degradation can lead to individual cell failures and, consequently, the failure of entire blocks, which can be referred to as "bad" blocks. Bad blocks may also arise from manufacturing defects. When a write operation to a block stripe encounters a bad block in a single die, this defect can cause the entire write operation to fail. If this occurs, the system tries to re-allocate the write operation to another available block stripe. However, if multiple blocks across different wordlines within a die fail, the entire die can become compromised, leading to repeated failures of write operations. Without adequate error handling, this cycle of failures continues, with the system persistently attempting to allocate new block stripes for writing, only to face further write operation failures. This situation can escalate until the system experiences a "drive panic," where it exhausts all available block stripes, severely compromising the storage device's functionality and data integrity.

Aspects of the present disclosure address the above and other deficiencies by having a memory sub-system that handles repeated programming operation errors. Specifically, the memory sub-system can use the approach described herein to temporarily isolate individual memory devices (e.g., dies in a NAND implementation) within a memory segment (e.g., a block stripe in a NAND implementation) that can be the cause of a repeated programming error. If an individual memory device experiences a threshold number of repeated programming failures, the memory sub-system prevents further programming operations on memory cells associated with the problematic memory device (i.e., the memory device is quarantined) until the memory device is deemed reliable enough to be written to again. In embodiments, a formerly quarantined memory device is deemed reliable enough to be written to again once the conditions under which the die was deemed unreliable are no longer present.

Advantages of the present disclosure include, but are not limited to preventing the exhaustion of free memory segments and the resulting drive panic. As a result, this decreases the failure rate and, as such, can allow for an improvement in latency as there is a lower read error failure trigger rate and, consequently, less system latency from read error handling (REH) operations. While the embodiments are described using NAND flash memory cells, the principles of the present disclosure can be applied to other types of memory sub-systems.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a repeated error handler component 113 that can temporarily quarantine individual memory devices within a memory segment. In some embodiments, the memory sub-system controller 115 includes at least a portion of the repeated error handler component 113. In some embodiments, the repeated error handler component 113 is part of the host system 120, an application, or an operating system. In other embodiments, local media controller 135 includes at least a portion of repeated error handler component 113 and is configured to perform the functionality described herein.

The repeated error handler component 113 can temporarily isolate individual memory devices (e.g., dies in a NAND implementation) within a memory segment (e.g., a block stripe in a NAND implementation) that can be the cause of a repeated programming error. If an individual memory device experiences a threshold number of repeated programming failures, the memory sub-system prevents further programming operations on memory cells associated with the problematic memory device until the memory device is deemed reliable enough to be written to again. In embodiments, a formerly quarantined memory device is deemed reliable enough to be written to again once the conditions under which the die was deemed unreliable is no longer true. Further details with regards to the operations of the repeated error handler component 113 are described below.

Figure 2:
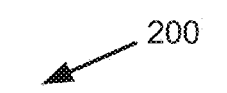
FIG. 2 is a flow diagram of an example method for handling repeated programming errors, in accordance with some embodiments of the present disclosure.
Figure 2:
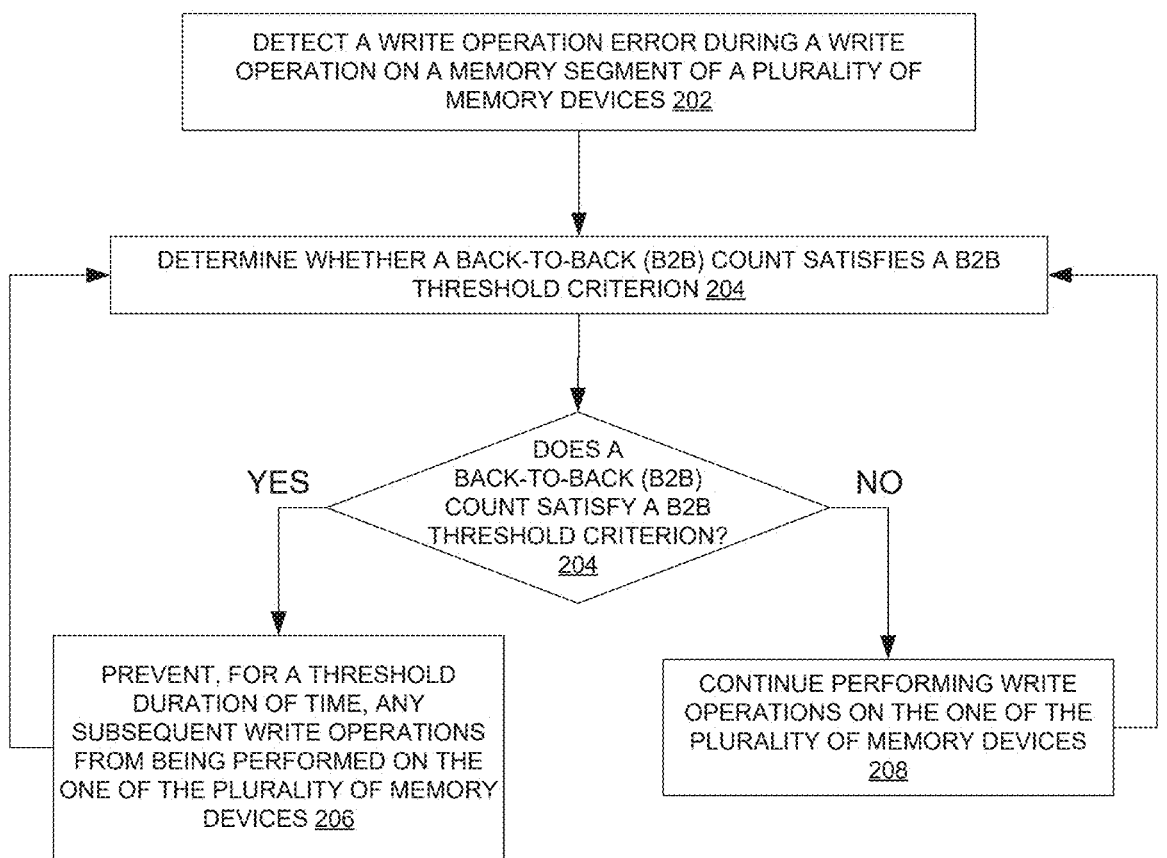

FIG. 2 is a flow diagram of an example method 200 for handling repeated programming errors, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the repeated error handler component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, the processing logic (e.g., the repeated error handler component 113) detects a write operation error during a write operation on a memory segment of the plurality of memory devices. In some embodiments, the memory segment comprises respective memory cells from each of the plurality of memory devices. For example, in a NAND memory device implementation, a memory segment can take the form of a block stripe comprising respective memory cells (e.g., memory cells in a single block) from each of a plurality of dies (i.e., the plurality of memory devices).

At operation 204, the processing logic determines whether a back-to-back (B2B) count satisfies a B2B threshold criterion, wherein the B2B count corresponds to one of the plurality of memory devices.

In some embodiments the B2B count comprises a number of repeated write operation errors from the one (e.g., a memory device) of the plurality of memory devices. In some embodiments, the B2B count can register multiple consecutive write operation errors from one of the plurality of memory devices (e.g., a die in NAND devices). In some embodiments, the B2B count can also register a number of non-consecutive write operation errors from one of the plurality of memory devices.

In some embodiments, the B2B threshold criterion is the maximum acceptable number of repeated write operation errors from one memory device (of the plurality of memory devices). In some embodiments, a B2B count of two repeated memory segment write operation errors satisfies the B2B threshold criterion. In some embodiments, this B2B threshold criterion is predetermined. In some embodiments, the processing logic continuously monitors the B2B count. In some embodiments, the B2B count decreases for a successful write operation on the memory segment following the number of repeated write operation errors from a memory device. In some embodiments, a successful write operation is registered as when a memory segment closes (e.g., no further write operations can be performed on the memory segment without executing an erase operation).

Responsive to determining that the B2B count satisfies the B2B threshold criterion, at operation 206, the processing logic prevents, for a threshold duration of time, any subsequent write operations from being performed on the memory device (of the plurality of memory devices). In some embodiments, the length of the threshold duration of time is determined by a period during which the B2B count continuously satisfies the B2B threshold criterion.

Responsive to determining that the B2B count fails to satisfy the B2B threshold criterion, at operation 208, the processing logic continues to allow the performance of write operations on the memory device (of the plurality of memory devices).

In some embodiments, to prevent any subsequent write operations from being performed on a memory device (of the plurality of memory devices), the processing logic marks the respective memory cells from the memory device (of the plurality of memory devices) with a blocking marker in a metadata table. For example, if a memory cell is associated with a memory device (e.g., a die) for which the B2B count satisfies the threshold criterion, the memory cells associated with that memory device are marked with a blocking marker in a metadata table. In some embodiments, this metadata table is a standalone table containing only quarantined block information. In some embodiments, the blocking marker information is stored in a metadata table with other data.

In some embodiments, responsive to determining that the B2B count no longer satisfies the B2B threshold criterion, the processing logic permits subsequent write operations to be performed on a memory device (of the plurality of memory devices). For example, if the B2B count were to decrease below the B2B threshold criterion, the processing logic stops marking memory cells associated with that memory device marked with a blocking marker.

In some embodiments, as part of determining whether to prevent, for a threshold duration of time, any subsequent write operations from being performed on the memory device (of the plurality of memory devices), the processing logic monitors the time elapsed between successful programming operations on the memory device. Responsive to determining that the time elapsed satisfies a maximum duration threshold criterion (e.g., exceeds a maximum duration of time), the processing device will further prevent subsequent write operations to be performed on a memory device.

In some embodiments, as part of determining whether to prevent, for a threshold duration of time, any subsequent write operations from being performed on the memory device (of the plurality of memory devices), the processing logic monitors the number of available memory segments for programming. If the number of available memory segments fails to satisfy a minimum available memory segments threshold criterion (e.g., the number of available memory segments falls below a predetermined minimum number of available memory segments) the processing device prevents programing to memory cells associated with the respective memory device.

Figure 3:
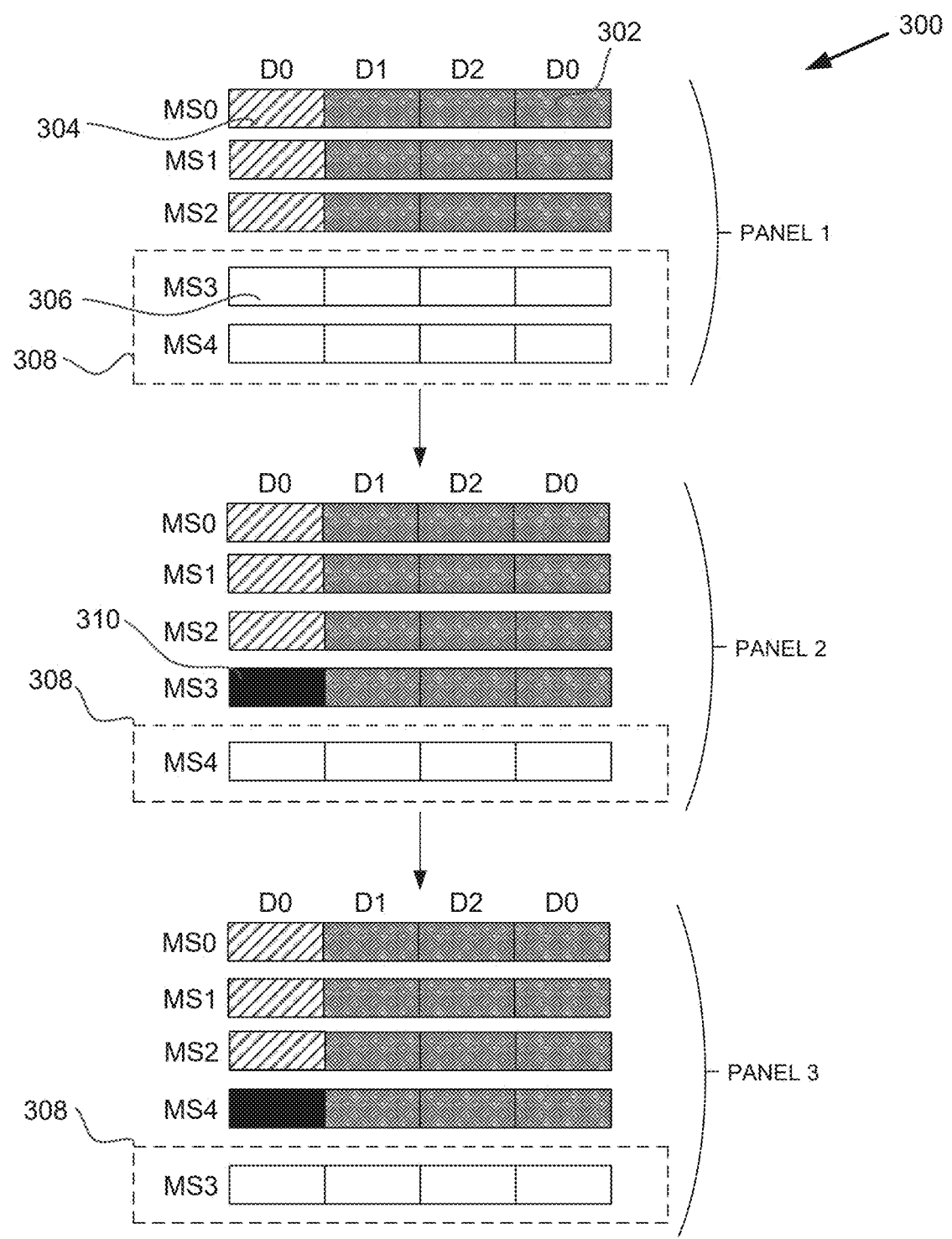
FIG. 3 illustrates an example implementation of the method for handling repeated programming errors, in accordance with some embodiments of the present disclosure.

FIG. 3 illustrates an example implementation 300 of the method for handling repeated programming errors, in accordance with some embodiments of the present disclosure. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. While the embodiments are described using NAND flash memory cells, the principles of the present disclosure can be applied to other types of memory sub-systems.

Panel 1, Panel 2, and Panel 3 each represent the same memory at different points in time. D0, D1, D2, and D3 each represent individual memory devices (e.g., dies) of a plurality of memory devices. MS0, MS1, MS2, MS3, and MS4 each represent a memory segment (e.g., block stripe) comprising respective memory cells (e.g., blocks) from each of the plurality of memory devices (e.g., dies). The pattern on Block 302 corresponds to successfully programmed memory cells. The pattern on Block 304 corresponds to memory cells where the programming operation failed. The pattern on Block 306 corresponds to memory cells that have not been written to and are available for programming. Pool 308 comprises memory segments that are available to be written to. In the example implementation 300, a B2B count of two repeated memory segment write operation errors satisfies the B2B threshold criterion (e.g., meeting or exceeding a B2B count of two).

In Panel 1, MS0, MS1, and MS2 experience repeated programming errors in blocks of memory cells associated with D0, registering a B2B count of three (e.g., one count for each programming error). As the B2B count satisfies the B2B threshold criterion (3≥2), the processing logic, as in operation 206, prevents any subsequent write operations from being performed on memory cells corresponding to D0.

Panel 2 illustrates the processing logic preventing any subsequent write operations from being performed on memory cells associated with D0. The pattern on Block 310 corresponds to memory cells that have been quarantined from programming operations. As detailed above in FIG. 2, in some embodiments, the mechanism with which memory cells are blocked comprises marking the respective memory cells (e.g., block 310) with a blocking marker in a metadata table. When the processing logic performs a write operation on MS3 (from the pool 308 in Panel 1), the processing logic does not write to the memory cells in MS3 corresponding to D0.

As detailed above in FIG. 2, in some embodiments the B2B count decreases for a successful write operation on the memory segment following the number of repeated write operation errors from the memory device. In FIG. 3, as a successful write operation was performed on MS3 with the quarantined memory cells, the B2B count is decreased by one, decreasing the B2B count to two.

In Panel 3, the processing logic determines that the decreased B2B count of two continues to satisfy the B2B threshold criterion. As a result, in the subsequent write operation to MS4, the processing logic continues to prevent memory cells corresponding to D0 from being programmed.

In some embodiments, the processing logic further performs media management operations on memory segments comprising quarantined memory cells. Possible media management operations include "folding." Folding is a media management operation performed by the processing logic involving rearranging and consolidating memory segments (for example, implementations using NAND technology can use blocks associated with the third set of target cells) to clear space occupied by "garbage" (invalid) data that is no longer in use. Folding merges smaller memory chunks comprising valid data into larger available blocks to minimize fragmentation and wasted space in the memory device.

The processing logic may scan one or more memory segments to determine whether the memory segment satisfies a validity threshold criterion (e.g., the amount of valid data items in any memory segment falls below a validity threshold such that it may affect performance and warrants the media management operation).

Responsive to determining that the memory segment satisfies the validity threshold criterion (e.g., valid data comprised in the memory segment is less than a specific percentage of the memory segment capacity), the processing logic performs a media management operation (garbage collection) on the memory segment. Conversely, responsive to determining that the memory segment fails to satisfy the validity threshold criterion, the processing logic does not perform a media management operation on the memory segment.

In FIG. 3, implementing a folding operation, the processing logic performs a read operation on the valid data (e.g., up to date, in-use data) from MS3. The processing logic performs a write operation on MS4, an available memory segment in Panel 2, to write data from the MS3 into the available memory segment, MS4. The processing logic performs an erase operation on the MS3. In some embodiments, as a result of the garbage collection operation, the blocking marker is removed from the memory cells in the memory segment. In addition, MS3 becomes associated with the Pool 308 as an available memory segment. For example, in FIG. 3, the blocking marker is removed from the memory cells corresponding to D0. In some embodiments, as part of this process, the processing logic removes the blocking marker data for the relevant memory cells from a metadata table.

Figure 4:
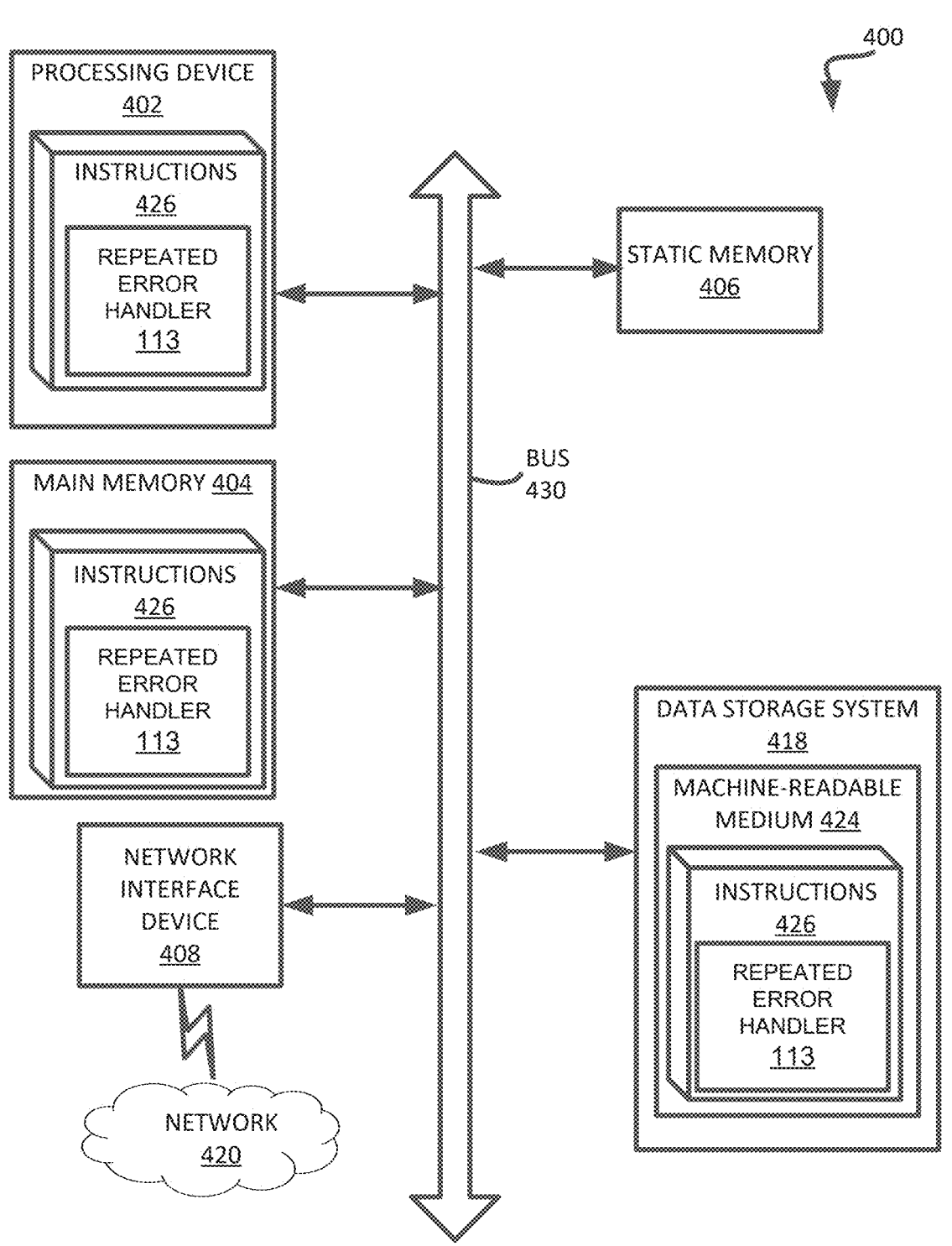
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the repeated error handler component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or RDRAM, etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a repeated error handler component (e.g., the repeated error handler component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a plurality of memory devices; and
a processing device, operatively coupled with the plurality of memory devices, to perform operations comprising:
detecting a write operation error during a write operation on a memory segment of the plurality of memory devices, wherein the memory segment comprises respective memory cells from each of the plurality of memory devices;
determining that a back-to-back (B2B) count satisfies a B2B threshold criterion, wherein the B2B count corresponds to one of the plurality of memory devices; and
responsive to determining that the B2B count satisfies the B2B threshold criterion, preventing, for a threshold duration of time, any subsequent write operations from being performed on the one of the plurality of memory devices, wherein a length of the threshold duration of time is determined by a period during which the B2B count continuously satisfies the B2B threshold criterion.

2. The system of claim 1, wherein the B2B count comprises a number of repeated write operation errors from the one of the plurality of memory devices.

3. The system of claim 2, wherein the B2B count of two repeated memory segment write operation errors satisfies the B2B threshold criterion.

4. The system of claim 2, wherein the B2B count decreases for a successful write operation on the memory segment following the number of repeated write operation errors from the one of the plurality of memory devices.

5. The system of claim 1, wherein the processing device is to perform operations further comprising:
responsive to determining that the B2B count no longer satisfies the B2B threshold criterion, permitting the subsequent write operations to be performed on the one of the plurality of memory devices.

6. The system of claim 1, wherein the processing device is to perform operations further comprising:

determining that the memory segment satisfies a validity threshold criterion; and responsive to determining that the memory segment satisfies the validity threshold criterion, performing a media management operation on the memory segment.

7. The system of claim 6, wherein performing the media management operation comprises:

performing a read operation on the memory segment;

performing a write operation on an available memory segment to write data from the memory segment, wherein the available memory segment has not been written to; and performing an erase operation on the memory segment.

8. The system of claim 1, wherein preventing any subsequent write operations from being performed on the one of the plurality of memory devices comprises:

marking the respective memory cells from the one of the plurality of memory devices with a blocking marker in a metadata table.

9. A method comprising:

detecting a write operation error during a write operation on a memory segment of a plurality of memory devices, wherein the memory segment comprises respective memory cells from each of the plurality of memory devices;

determining that a back-to-back (B2B) count satisfies a B2B threshold criterion, wherein the B2B count corresponds to one of the plurality of memory devices; and responsive to determining that the B2B count satisfies the B2B threshold criterion, preventing, for a threshold duration of time, any subsequent write operations from being performed on the one of the plurality of memory devices, wherein a length of the threshold duration of time is determined by a period during which the B2B count continuously satisfies the B2B threshold criterion.

10. The method of claim 9, wherein the B2B count comprises a number of repeated write operation errors from the one of the plurality of memory devices.

11. The method of claim 10, wherein the B2B count of two repeated memory segment write operation errors satisfies the B2B threshold criterion.

12. The method of claim 10, wherein the B2B count decreases for a successful write operation on the memory segment following the number of repeated write operation errors from the one of the plurality of memory devices.

13. The method of claim 9, further comprising:

responsive to determining that the B2B count no longer satisfies the B2B threshold criterion, permitting the subsequent write operations to be performed on the one of the plurality of memory devices.

14. The method of claim 9, further comprising:

determining that the memory segment satisfies a validity threshold criterion; and responsive to determining that the memory segment satisfies the validity threshold criterion, performing a media management operation on the memory segment.

15. The method of claim 14, wherein performing the media management operation comprises:

performing a read operation on the memory segment;

performing a write operation on an available memory segment to write data from the memory segment, wherein the available memory segment has not been written to; and performing an erase operation on the memory segment.

16. The method of claim 9, wherein preventing any subsequent write operations from being performed on the one of the plurality of memory devices comprises:

marking the respective memory cells from the one of the plurality of memory devices with a blocking marker in a metadata table.

17. A non-transitory computer-readable storage medium comprising instructions that, when executed by a processing device, cause the processing device to perform operations comprising:

detecting a write operation error during a write operation on a memory segment of a plurality of memory devices, wherein the memory segment comprises respective memory cells from each of the plurality of memory devices;

determining that a back-to-back (B2B) count satisfies a B2B threshold criterion, wherein the B2B count corresponds to one of the plurality of memory devices; and responsive to determining that the B2B count satisfies the B2B threshold criterion, preventing, for a threshold duration of time, any subsequent write operations from being performed on the one of the plurality of memory devices, wherein a length of the threshold duration of time is determined by a period during which the B2B count continuously satisfies the B2B threshold criterion.

18. The non-transitory computer-readable storage medium of claim 17, wherein the B2B count comprises a number of repeated write operation errors from the one of the plurality of memory devices.

19. The non-transitory computer-readable storage medium of claim 18, wherein the B2B count of two repeated memory segment write operation errors satisfies the B2B threshold criterion.

20. The non-transitory computer-readable storage medium of claim 18, wherein the B2B count decreases for a successful write operation on the memory segment following the number of repeated write operation errors from the one of the plurality of memory devices.

* * * * *